(12) United States Patent
Kelly et al.

(10) Patent No.: US 11,823,130 B2
(45) Date of Patent: Nov. 21, 2023

(54) SYSTEMS AND METHODS FOR ACCESSING AND STORING SNAPSHOTS OF A REMOTE APPLICATION IN A DOCUMENT

(71) Applicant: Palantir Technologies Inc., Palo Alto, CA (US)

(72) Inventors: Sean Kelly, McLean, VA (US); Mike Kattouf, Arlington, VA (US); Asa Martin, Vienna, VA (US); James Shuster, Arlington, VA (US); Andrew Sheh, McLean, VA (US); Elston Tochip, Arlington, VA (US); Paul Thoren, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/413,970

(22) Filed: May 16, 2019

(65) Prior Publication Data
US 2019/0303868 A1 Oct. 3, 2019

Related U.S. Application Data

(63) Continuation of application No. 14/601,735, filed on Jan. 21, 2015, now Pat. No. 10,387,834.

(51) Int. Cl.
*G06Q 10/10* (2023.01)
(52) U.S. Cl.
CPC .................... *G06Q 10/10* (2013.01)
(58) Field of Classification Search
CPC ..................................................... G06Q 10/10
See application file for complete search history.

(56) References Cited

U.S. PATENT DOCUMENTS 5,652,717 A * 7/1997 Miller ..................... G06T 17/05
703/6
5,835,758 A * 11/1998 Nochur ................... G06F 40/10
707/999.102

(Continued)

FOREIGN PATENT DOCUMENTS

EP          3188052 A2      7/2017
WO     WO-2015183397 A1    12/2015

OTHER PUBLICATIONS

"7 Things You Should Know About . . . Collaborative Annotation", (2009), 2 pgs.

(Continued)

*Primary Examiner* — Shahid K Khan
(74) *Attorney, Agent, or Firm* — Faegre Drinker Biddle Reath LLP

(57) ABSTRACT

Computer-implemented systems and methods are disclosed to interface with a storage device storing a file, wherein the file comprises first data associated with an artifact configured to be displayed in a first interface at a first electronic device, the artifact including a first representation state representing a first visual depiction of one or more data objects. In accordance with some embodiments, a method is provided to provide access via the first interface to the one or more data objects. The method comprises acquiring the first data associated with artifact. The method further comprises acquiring an activation of at least part of the artifact, and responsive to acquiring the activation, transmitting a first request to a second electronic device for second data associated with the artifact. The method further comprises acquiring the second data, wherein the second data allows the first visual depiction to be altered to a second visual depiction.

20 Claims, 14 Drawing Sheets

(56) References Cited

U.S. PATENT DOCUMENTS

| | | | | |
|---|---|---|---|---|
| 5,892,900 A * | 4/1999 | Ginter | | G06F 21/78 |
| | | | | 726/26 |
| 6,144,318 A * | 11/2000 | Hayashi | | G08G 1/0969 |
| | | | | 340/988 |
| 6,199,195 B1 * | 3/2001 | Goodwin | | G06F 8/35 |
| | | | | 707/999.1 |
| 6,219,053 B1 * | 4/2001 | Tachibana | | G06F 3/0481 |
| | | | | 715/862 |
| 6,243,706 B1 * | 6/2001 | Moreau | | G06Q 10/10 |
| 6,247,019 B1 * | 6/2001 | Davies | | G01C 21/3867 |
| | | | | 434/152 |
| 6,341,310 B1 * | 1/2002 | Leshem | | G06Q 30/02 |
| | | | | 714/E11.181 |
| 6,366,933 B1 * | 4/2002 | Ball | | G06F 16/957 |
| | | | | 707/E17.119 |
| 6,456,997 B1 * | 9/2002 | Shukla | | G06Q 10/06 |
| 6,581,068 B1 * | 6/2003 | Bensoussan | | G06F 16/283 |
| | | | | 707/999.102 |
| 6,642,945 B1 * | 11/2003 | Sharpe | | G06F 16/9577 |
| | | | | 715/788 |
| 6,642,946 B1 * | 11/2003 | Janes | | G06Q 10/087 |
| | | | | 715/962 |
| 6,714,936 B1 * | 3/2004 | Nevin, III | | G06F 16/9024 |
| | | | | 703/2 |
| 6,877,137 B1 * | 4/2005 | Rivette | | G06F 16/955 |
| | | | | 707/E17.112 |
| 7,051,039 B1 | 5/2006 | Murthy et al. | | |
| 7,171,427 B2 * | 1/2007 | Witkowski | | G06F 16/2264 |
| 7,283,909 B1 * | 10/2007 | Olsen | | G09B 29/007 |
| | | | | 702/5 |
| 7,418,656 B1 | 8/2008 | Petersen | | |
| 7,529,727 B2 * | 5/2009 | Arning | | G06F 16/2264 |
| | | | | 707/E17.057 |
| 7,962,495 B2 * | 6/2011 | Jain | | G06F 40/284 |
| | | | | 706/2 |
| 8,103,445 B2 * | 1/2012 | Smith | | G09B 29/007 |
| | | | | 701/425 |
| 8,468,469 B1 * | 6/2013 | Mendis | | G06F 3/04883 |
| | | | | 715/788 |
| 8,554,719 B2 * | 10/2013 | McGrew | | G06F 16/252 |
| | | | | 707/602 |
| 8,560,494 B1 * | 10/2013 | Downing | | G06F 16/211 |
| | | | | 707/726 |
| 8,566,353 B2 | 10/2013 | Fink et al. | | |
| 8,635,520 B2 | 1/2014 | Christiansen et al. | | |
| 8,799,240 B2 * | 8/2014 | Stowe | | G06F 16/2365 |
| | | | | 707/693 |
| 8,924,872 B1 * | 12/2014 | Bogomolov | | G06F 3/0481 |
| | | | | 715/764 |
| 8,930,331 B2 * | 1/2015 | McGrew | | G06F 16/1873 |
| | | | | 707/695 |
| 9,021,361 B1 * | 4/2015 | Pettinati | | G06Q 30/00 |
| | | | | 715/736 |
| 9,411,896 B2 * | 8/2016 | Frank | | G06F 16/48 |
| 9,753,921 B1 | 9/2017 | Devincenzi et al. | | |
| 10,042,832 B1 | 8/2018 | Vagell | | |
| 10,089,289 B2 | 10/2018 | Sood et al. | | |
| 2002/0116120 A1 * | 8/2002 | Ruiz | | G09B 29/006 |
| | | | | 340/995.11 |
| 2002/0145620 A1 * | 10/2002 | Smith | | G06F 16/29 |
| | | | | 707/999.003 |
| 2004/0027395 A1 * | 2/2004 | Lection | | G06F 3/0481 |
| | | | | 715/855 |
| 2004/0117358 A1 * | 6/2004 | von Kaenel | | G06F 16/29 |
| 2005/0114661 A1 * | 5/2005 | Cheng | | G06F 21/6218 |
| | | | | 713/167 |
| 2005/0188016 A1 | 8/2005 | Vdaygiri et al. | | |
| 2006/0139375 A1 * | 6/2006 | Rasmussen | | G06F 3/0481 |
| | | | | 707/E17.11 |
| 2006/0288014 A1 * | 12/2006 | Edwards | | G06Q 10/06 |
| 2007/0011147 A1 * | 1/2007 | Falkenberg | | G06F 16/33 |
| 2007/0118794 A1 | 5/2007 | Hollander et al. | | |
| 2007/0168370 A1 * | 7/2007 | Hardy | | G06F 16/29 |
| 2007/0239352 A1 * | 10/2007 | Thota | | G08G 1/005 |
| | | | | 701/532 |
| 2008/0072290 A1 * | 3/2008 | Metzer | | G06F 16/2308 |
| | | | | 726/2 |
| 2008/0140657 A1 * | 6/2008 | Azvine | | G06F 16/338 |
| 2008/0172407 A1 * | 7/2008 | Sacks | | G06Q 10/10 |
| | | | | 707/999.102 |
| 2008/0307498 A1 * | 12/2008 | Johnson | | G06F 21/6218 |
| | | | | 726/3 |
| 2008/0319990 A1 * | 12/2008 | Taranenko | | G06F 16/29 |
| | | | | 707/999.005 |
| 2009/0003657 A1 * | 1/2009 | Deardorff | | G06F 16/29 |
| | | | | 382/113 |
| 2009/0006323 A1 * | 1/2009 | Deardorff | | G06Q 30/02 |
| 2009/0013271 A1 * | 1/2009 | Helfman | | G06F 16/26 |
| | | | | 715/764 |
| 2009/0013287 A1 * | 1/2009 | Helfman | | G06F 3/048 |
| | | | | 715/853 |
| 2009/0112910 A1 * | 4/2009 | Picault | | G06Q 30/02 |
| | | | | 707/999.102 |
| 2009/0192703 A1 * | 7/2009 | Hess | | G01C 21/3664 |
| | | | | 345/184 |
| 2009/0324134 A1 * | 12/2009 | Howell | | G06F 16/9577 |
| | | | | 382/284 |
| 2010/0146436 A1 * | 6/2010 | Jakobson | | G09B 29/006 |
| | | | | 715/800 |
| 2010/0277588 A1 * | 11/2010 | Ellsworth | | G06F 16/9537 |
| | | | | 707/769 |
| 2011/0061016 A1 * | 3/2011 | Song | | H04W 4/02 |
| | | | | 709/227 |
| 2011/0113320 A1 | 5/2011 | Neff et al. | | |
| 2011/0154434 A1 * | 6/2011 | Hernacki | | G06F 21/31 |
| | | | | 726/1 |
| 2011/0185012 A1 * | 7/2011 | Colley | | G06Q 10/10 |
| | | | | 709/203 |
| 2011/0270922 A1 | 11/2011 | Jones et al. | | |
| 2011/0313649 A1 * | 12/2011 | Bales | | G01C 21/367 |
| | | | | 345/589 |
| 2012/0139754 A1 * | 6/2012 | Ginsberg | | G08G 1/096775 |
| | | | | 340/905 |
| 2012/0188252 A1 * | 7/2012 | Law | | G06F 16/248 |
| | | | | 345/440 |
| 2012/0213416 A1 * | 8/2012 | Lorimer | | G06F 16/29 |
| | | | | 382/113 |
| 2013/0014046 A1 * | 1/2013 | Watts | | G06F 3/0481 |
| | | | | 715/772 |
| 2013/0073994 A1 * | 3/2013 | Liao | | G06F 9/44 |
| | | | | 715/762 |
| 2013/0073996 A1 * | 3/2013 | Garcia | | G06Q 10/0637 |
| | | | | 715/764 |
| 2013/0097481 A1 | 4/2013 | Kotler et al. | | |
| 2013/0246901 A1 | 9/2013 | Massand | | |
| 2013/0307843 A1 * | 11/2013 | Sikka | | G06T 15/00 |
| | | | | 345/419 |
| 2013/0321450 A1 * | 12/2013 | Hultquist | | G01C 21/367 |
| | | | | 345/619 |
| 2014/0006921 A1 | 1/2014 | Gopinath et al. | | |
| 2014/0019843 A1 | 1/2014 | Schmidt | | |
| 2014/0026025 A1 | 1/2014 | Smith | | |
| 2014/0111520 A1 * | 4/2014 | Cline | | G06T 11/206 |
| | | | | 345/440 |
| 2014/0282973 A1 * | 9/2014 | Langley | | G06F 21/36 |
| | | | | 726/7 |
| 2015/0178259 A1 | 6/2015 | Davis et al. | | |
| 2015/0234837 A1 * | 8/2015 | Rowe | | G06Q 10/10 |
| | | | | 707/769 |
| 2015/0339034 A1 | 11/2015 | Garcia | | |
| 2016/0110823 A1 * | 4/2016 | Wood | | G06Q 50/163 |
| | | | | 705/314 |
| 2016/0147399 A1 | 5/2016 | Berajawala et al. | | |
| 2016/0210270 A1 | 7/2016 | Kelly et al. | | |
| 2016/0308940 A1 | 10/2016 | Procopio et al. | | |
| 2017/0161246 A1 | 6/2017 | Klima | | |
| 2017/0185575 A1 | 6/2017 | Sood et al. | | |

(56) References Cited

U.S. PATENT DOCUMENTS

2018/0103341 A1* 4/2018 Moiyallah, Jr. ..... G06F 3/04842
2018/0212975 A1* 7/2018 Bandi ................. H04L 63/0428
2019/0026258 A1 1/2019 Sood et al.

OTHER PUBLICATIONS

"U.S. Appl. No. 14/601,735, Final Office Action dated May 3, 2018", 29 pgs.
"U.S. Appl. No. 14/601,735, Final Office Action dated Jul. 11, 2017", 25 pgs.
"U.S. Appl. No. 14/601,735, Non Final Office Action dated Nov. 15, 2017", 28 pgs.
"U.S. Appl. No. 14/601,735, Notice of Allowance dated Apr. 10, 2019", 7 pgs.
"U.S. Appl. No. 15/051,565, Final Office Action dated Mar. 19, 2018", 15 pgs.
"U.S. Appl. No. 15/051,565, Final Office Action dated Jun. 28, 2017", 12 pgs.
"U.S. Appl. No. 15/051,565, Non Final Office Action dated Apr. 6, 2017", 11 pgs.
"U.S. Appl. No. 15/051,565, Non Final Office Action dated Oct. 18, 2017", 14 pgs.
"U.S. Appl. No. 15/051,565, Notice of Allowance dated Jun. 1, 2018", 6 pgs.
"U.S. Appl. No. 16/046,397, Final Office Action dated Jun. 26, 2019", 14 pgs.
"U.S. Appl. No. 16/046,397, Non Final Office Action dated Jan. 25, 2019", 12 pgs.
"European Application Serial No. 14159464.8, Extended European Search Report dated Jul. 31, 2014", 7 pgs.
"European Application Serial No. 14159464.8, Notice of Publication dated Aug. 20, 2014", 2 pgs.
"European Application Serial No. 16207360.5, Communication Pursuant to Article 94(3) EPC dated Dec. 6, 2018", 6 pgs.
"European Application Serial No. 16207360.5, Extended European Search Report dated Jun. 16, 2017", 8 pgs.
Hunter, J, et al., "Collaborative Annotation of 3D Crystallographic Models", The University of Queensland; I. Chem. Inf Model. 47, 2475-2484, (2007), 10 pgs.
Hunter, Jane, et al., "Towards Annotopia—Enabling the Semantic Interoperability of Web-Based Annotations", Future Internet, (2012), 19 pgs.
U.S. Appl. No. 14/601,735 U.S. Pat. No. 10,387,834, filed Jan. 21, 2015, Systems and Methods for Accessing and Stroing Snapshots of a Remote Application in a Document.

* cited by examiner

Data Object 363

| Object ID | Object Type | |
|---|---|---|
| 123456 | Human | |
| Property Type | Property Value | Access Control |
| Name | John | Display only |
| Profession | Terrorist | Inaccessible |
| Language | Japanese | Display/Edit |
| Birthplace | Chad | Display only |
| Organization Name | Mr. Assassins | Inaccessible |

FIG. 3B

SYSTEMS AND METHODS FOR ACCESSING AND STORING SNAPSHOTS OF A REMOTE APPLICATION IN A DOCUMENT

BACKGROUND

It is common to incorporate data objects into a document file. For example, Microsoft Word™ allows a user to include Microsoft Visio™ diagram objects into a document file, which allows the user to not only view the diagram objects as they appear in the document file, but also to invoke a Microsoft Visio™ editing environment to edit the diagram objects. Such an approach, however, has several shortcomings. For example, by storing the entirety of the data objects as part of the document file, the file size becomes very large, and the document file becomes less portable as more data objects are incorporated in the file. Also, if the document file is to be shared with other users, each having different access privileges to different data within the stored data object, it is difficult to set differentiating access policies for various data of the stored data objects in a single document file.

BRIEF DESCRIPTION OF THE DRAWINGS

Reference will now be made to the accompanying drawings showing example embodiments of the present application, and in which:

FIG. 3B is a chart illustrating an exemplary data object, consistent with embodiments of the present disclosure.

DETAILED DESCRIPTION OF EXEMPLARY EMBODIMENTS

Figure 1:
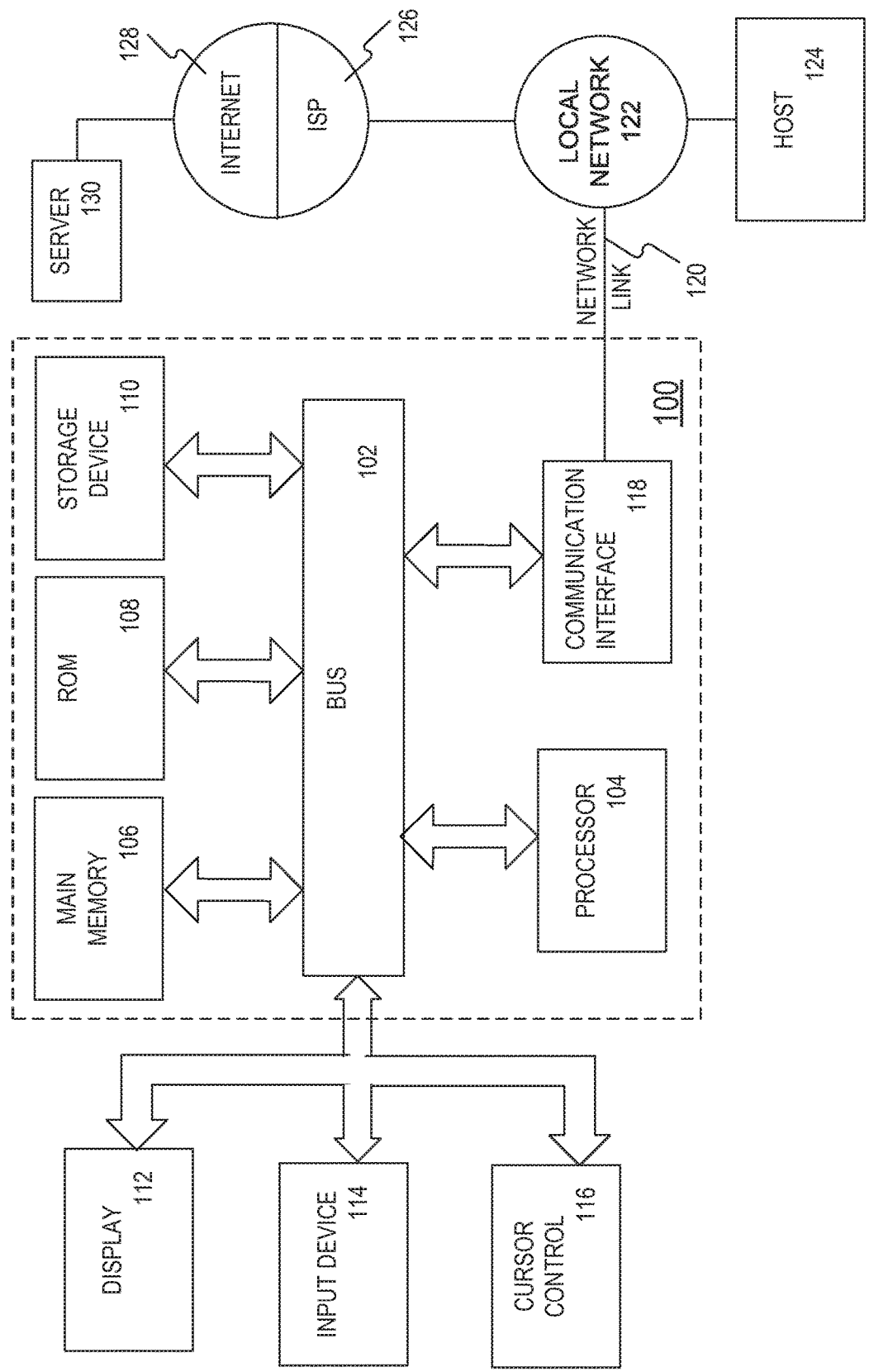
FIG. 1 is a block diagram of an exemplary computer system with which embodiments described herein can be implemented, consistent with embodiments of the present disclosure.

Reference will now be made in detail to the embodiments, the examples of which are illustrated in the accompanying drawings. Whenever possible, the same reference numbers will be used throughout the drawings to refer to the same or like parts.

Embodiments of the present disclosure provides a means to facilitate the incorporation and sharing of data via a document file, by allowing a user to access the data, not stored as part of the document file, while accessing the document file. As an exemplary illustration, the data is stored in a remote location separately from the document file. An interface can be provided to enable a user who accesses the document to also access the data stored in the remote location. Access control policy can be implemented as the data is being provided via the interface. Each user who accesses the data via the interface can also, depending on his or her access rights, update the data via the interface as viewed locally.

Embodiments of the present disclosure also provide a means to facilitate representation of the data. As an exemplary illustration, a state of representation of remotely stored data is stored as part of the document file. When a user opens the document file via an interface to access the remotely stored data, the data can be represented in the interface according to the stored state of representation. The user can also manipulate the representation of the data, and can choose to either overwrite the stored state, or to revert back to the previously-stored state.

The capability of storing a state of representation of the data, instead of the data itself, as part of the document, can allow the document file to be portable and easy to share. Such a capability also allows a user to interact with the data, which can facilitate efficient representation of the data. It also improves user experience when, for example, the data being represented is related to a content of the document file that the user is accessing. The separated access of data and their states of representation also provides easy management of access rights among each user with respect to various portions of the data presented in the document.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

FIG. 1 is a block diagram of an exemplary computer system 100 with which embodiments described herein can be implemented, consistent with embodiments of the present disclosure. Computer system 100 includes a bus 102 or other communication mechanism for communicating information, and one or more hardware processors 104 (denoted as processor 104 for purposes of simplicity) coupled with bus 102 for processing information. Hardware processor 104 can be, for example, one or microprocessors.

Computer system 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, after being stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Computer system 100 can be coupled via bus 102 to a display 112, such as a cathode ray tube (CRT), an liquid crystal display (LCD), or a touch screen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 100 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 100 can implement the techniques described herein using customized hard-wired logic, one or more ASICs or FPGAs, firmware and/or program logic which in combination with the computer system causes or programs computer system 100 to be a special-purpose machine. According to some embodiments, the operations, functionalities, and techniques and other features described herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 110. Volatile media can include dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, processor caches, registers, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 can also include a communication interface 118 coupled to bus 102. Communication interface 118 can provide a two-way data communication coupling to a network link 120 that can be connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 can send and receive electrical, electromagnetic or optical signals that carry digital data streams representing various types of information.

Network link 120 can typically provide data communication through one or more networks to other data devices. For example, network link 120 can provide a connection through local network 122 to a host computer 124 or to data equipment operated by an Internet Service Provider (ISP) 126. ISP 126 in turn can provide data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, can be example forms of transmission media.

Computer system 100 can send messages and receive data, including program code, through the network(s), network link 120 and communication interface 118. In the Internet example, a server 130 can transmit a requested code for an application program through Internet 128, ISP 126, local network 122 and communication interface 118.

The received code can be executed by processor 104 as it is received, and/or stored in storage device 110, or other non-volatile storage for later execution. In some embodiments, server 130 can provide information for being displayed on a display.

Figure 2:
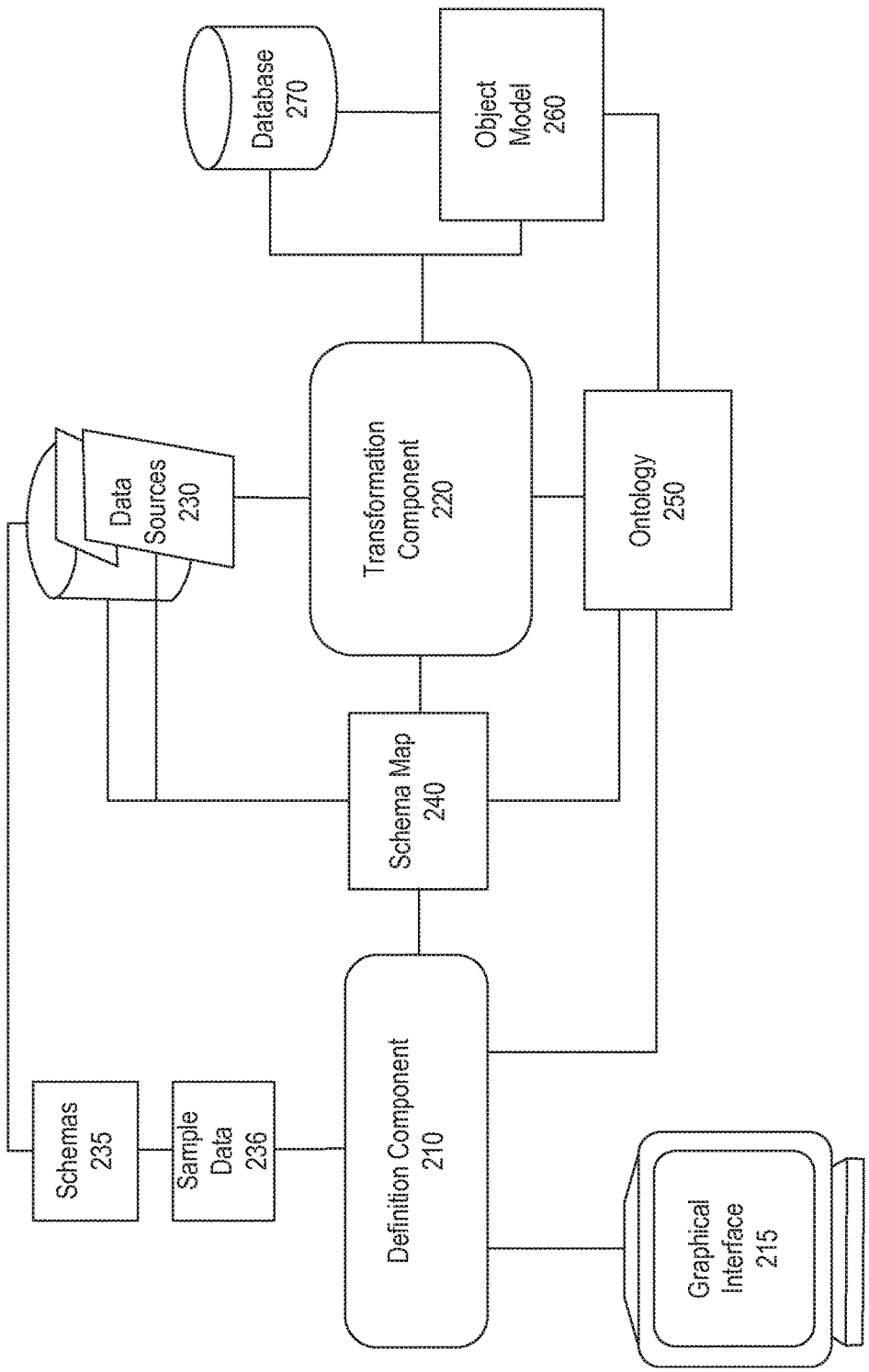
FIG. 2 is a block diagram depicting an exemplary internal database system, consistent with embodiments of the present disclosure.

FIG. 2 is a block diagram depicting an exemplary internal database system 200, consistent with embodiments of the present disclosure. Among other things, system 200 facilitates transformation of one or more data sources, such as data sources 230, into an object model 260, whose semantics are defined by an ontology 250. The transformation can be performed for a variety of reasons. For example, a database administrator can wish to import data from data sources 230 into a database 270 for persistently storing object model 260. As another example, a data presentation component (not depicted) can transform input data from data sources 230 "on the fly" into object model 260. Object model 260 can then be utilized, in conjunction with ontology 250, for analysis through graphs and/or other data visualization techniques.

System 200 comprises a definition component 210 and a transformation component 220, both implemented by one or more processors on one or more computing devices executing hardware and/or software-based logic for providing various functionality described herein. As will be appreciated from the present disclosure, system 200 can comprise fewer or additional components that provide various functionalities described herein. Such components are, for clarity, omitted from FIG. 1. Moreover, the component(s) of system 200 responsible for providing various functionalities can further vary from embodiment to embodiment.

Definition component 210 generates and/or modifies ontology 250 and a schema map 240. Exemplary embodiments for defining an ontology (such as ontology 250) is described in U.S. Pat. No. 7,962,495 (the '495 Patent), issued Jun. 14, 2011, the entire contents of which are expressly incorporated herein by reference for all purposes. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time.

In some embodiments, each property type is declared to be representative of one or more object types. A property type is representative of an object type when the property type is intuitively associated with the object type. For example, a property type of "profession" can be representative of an object type "human" but not representative of an object type "locale." Each object can be identified with an identifier, and each property type can be associated with a property value.

Schema map 240 can define how various elements of schemas 235 for data sources 230 map to various elements of ontology 250. Definition component 210 receives, calculates, extracts, or otherwise identifies schemas 235 for data sources 230. Schemas 235 define the structure of data sources 230—for example, the names and other characteristics of tables, files, columns, fields, properties, and so forth. Definition component 210 furthermore optionally identifies sample data 236 from data sources 230. Definition component 210 can further identify object type, relationship, and property definitions from ontology 250, if any already exist. Definition component 210 can further identify pre-existing mappings from schema map 240, if such mappings exist.

Transformation component 220 can be invoked after schema map 140 and ontology 250 have been defined or redefined. Transformation component 220 identifies schema map 240 and ontology 250. Transformation component 120 further reads data sources 230 and identifies schemas 235 for data sources 230. For each element of ontology 250 described in schema map 240, transformation component 220 iterates through some or all of the data items of data sources 230, generating elements of object model 260 in the manner specified by schema map 240. In some embodiments, transformation component 220 can store a representation of each generated element of object model 260 in a database 270. In some embodiments, transformation component 220 is further configured to synchronize changes in object model 160 back to data sources 230.

Data sources 230 can be one or more sources of data, including, without limitation, spreadsheet files, databases, email folders, document collections, media collections, contact directories, and so forth. Data sources 230 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 230 can include data structures stored persistently in non-volatile memory. Data sources 230 can also or instead include temporary data structures generated from underlying data sources via data extraction components, such as a result set returned from a database server executing an database query.

Schema map 240, ontology 250, and schemas 235 can be stored in any suitable data structures, such as XML files, database tables, and so forth. In some embodiments, ontology 250 is maintained persistently. Schema map 240 can or cannot be maintained persistently, depending on whether the transformation process is perpetual or a one-time event. Schemas 235 need not be maintained in persistent memory, but can be cached for optimization.

Object model 260 comprises collections of elements such as typed objects, properties, and relationships. The collections can be structured in any suitable manner. In some embodiments, a database 270 stores the elements of object model 260, or representations thereof. In some embodiments, the elements of object model 260 are stored within database 270 in a different underlying format, such as in a series of object, property, and relationship tables in a relational database Based on the identified information, definition component 210 can generate a graphical interface 215. Graphical interface 215 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 215 can feature a visual workspace that visually depicts representations of the elements of ontology 250 for which mappings are defined in schema map 240. Graphical interface 215 can further utilize sample data 236 to provide the user with a preview of object model 260 as the user defines schema map 240. In response to the input via the various controls of graphical interface 215, definition component 210 can generate and/or modify ontology 250 and schema map 240, and/or identify object models and sample data schemas 235 and data sources 230. In some embodiments, one or more states of representation of the elements of ontology 250 can be stored separately from data schemes 235 and data sources 230, and graphical interface 215 can represent graphically, for example, sample data 236 according to the one or more states of representation.

Figure 3A:
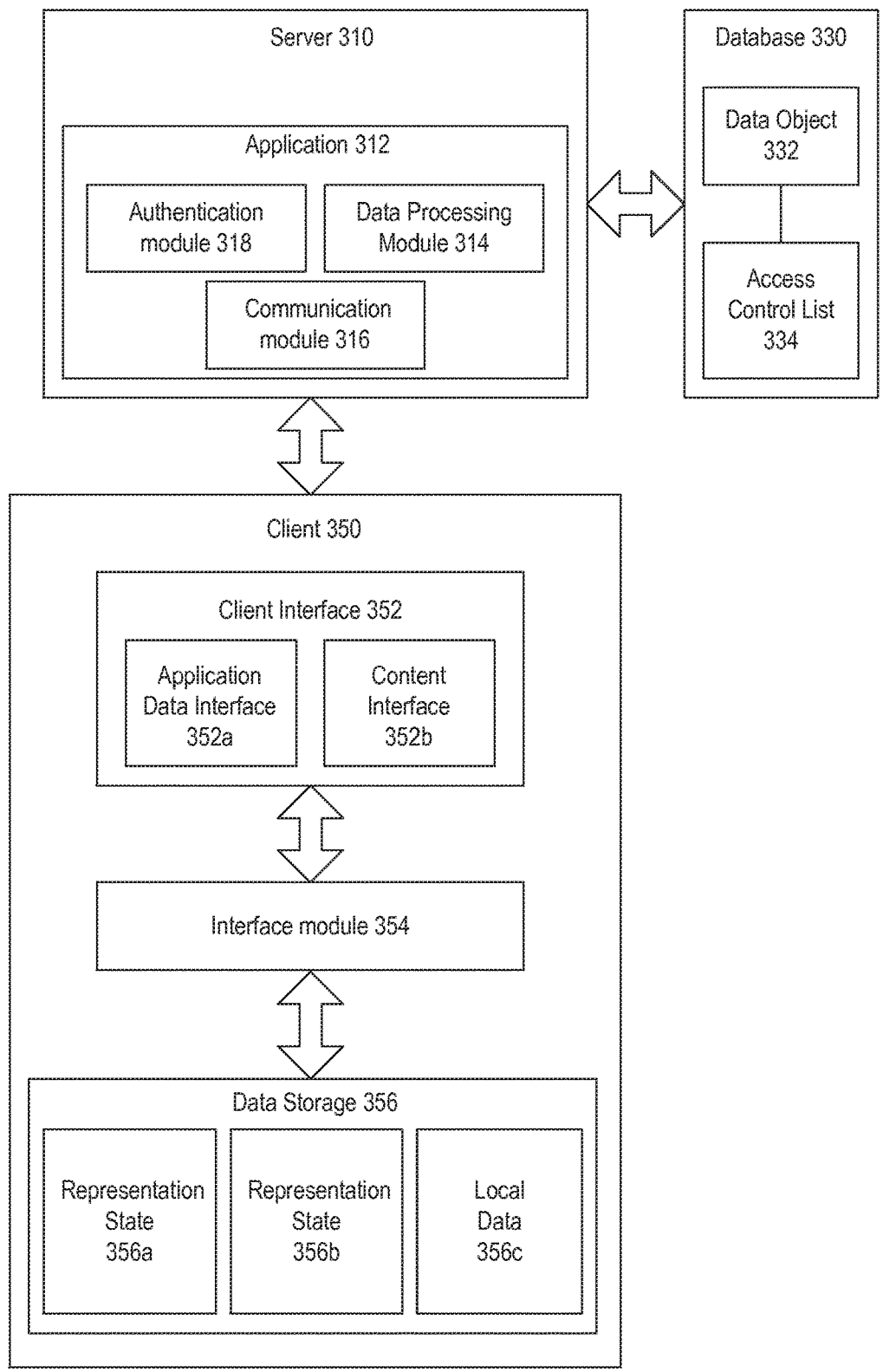
FIG. 3A is a block diagram illustrating an exemplary system providing an interface to access and represent data objects based on a stored state of representation, consistent with embodiments of the present disclosure.

FIG. 3A is a block diagram illustrating an exemplary system 300 providing an interface to access and represent data objects based on a stored state of representation, consistent with embodiments of the present disclosure. In some embodiments, system 300 provides a server 310 coupled with a database 330. Database 330 can include similar features as database 270 as shown in FIG. 2. While FIG. 3A shows server 310 and database 330 being separate components, it is appreciated that server 310 and database 330 can be part of the same component. Server 310 can communicate with client device 350 and can allow client device 350 to access database 330.

As shown in FIG. 3A, server 310 can host an application 312, which can include modules to provide data (e.g., sample data 236 or data of database 270) to be represented. Application 312 can include a data processing module 314, which processes a request from client device 350 to access appropriate data. Based on this request, data processing module 314 can then acquire the requested data from database 330, and transmit at least part of the acquired data to the client. Application 312 can also include a communication module 316, which can interact with communication interface 118 as shown in FIG. 1 to, for example, facilitate the acquisition of data from server 310 and the transmission of the acquired data to client device 350.

In some embodiments, the requested sample data 236 can include the data represented by one or more data objects 332 defined according to object model 260 as shown in FIG. 2 and stored in database 330. Data object 332 can also be associated with an access control list 334. Exemplary embodiments for access control list 334 are described in U.S. patent application Ser. No. 13/956,326, entitled "Techniques for Replicating Changes to Access Control Lists on Investigative Analysis Data," filed Jul. 31, 2013 (now U.S. Pat. No. 8,838,538), and in U.S. patent application Ser. No. 14/286,485, entitled "Cross-ACL Multi-Master Replication," filed May 23, 2014, the entire contents of which are expressly incorporated herein by reference for all purposes. Access control list 334 can include information governing an access to data object 332. For example, access control list 334 can include a list of users who can access data object 332, and how they can access the object. As an example, the access control list can define whether a particular user can read or write to the object, and to which particular attribute(s) or property(s) of the object.

In some embodiments, application 312 can also include an authentication module 318. Authentication module 318 can receive identification information from client device 350 to identify a particular user using the client device to request for data object 332. Authentication module 318 can then provide the identification information to data processing module 314. Data processing module 314 can then determine, based on the identification information and access control list 334 information associated with data object 332, which part of data object 332 is to be sent to client device 350. In some embodiments, authentication module 318 can acquire one or more credentials, such as a user login name and a password, from the client device, and then match that information against a user database (not shown in FIG. 3A), to verify the authenticity of the user and to establish the user's identity. In some embodiments, server 310 can receive credential information for a group of participants.

In some embodiments, client device 350 can include a display device (not shown in FIG. 3A) to provide a client interface 352. Client interface 352 can include one or more application data interfaces 352a to access data object 332 provided by application 312. In some embodiments, client interface 352 can display a page of a document or a presentation slide and provide a representation of data object 332 via application data interface 352a concurrently. Client interface 352 can also include one or more content interfaces 352b to access other data of the document or the presentation slide acquired separately from data object 332. The content data can be, for example, text data, graphics or video data, audio data, or any other embedded data object. In some embodiments, client interface 352 can provide either interface 352a or interface 352b at a time, and allow switching between the two interfaces. In some embodiments, both interface 352a and 352b are provided concurrently.

Client device 350 can also include an interface module 354. Interface module 354 can provide the data to be rendered in client interface 352. In some embodiments, interface module 354 can receive one or more data objects 332 from application 312 and, based on a state of representation of the data objects, provide data for rendering the data objects via application data interface 352a in the display device. A state of representation can be included as part of an artifact. An artifact can include a collection of data used to facilitate a displaying of data objects 332 via application data interface 352a. The representation can be graphical and/or textual visual depiction. In some embodiments, the artifact can include, for example, an identifier for the application 312 that provides the data objects 332, a list of data objects 332 to be represented, and any other information pertinent to the graphical rendering of the data objects, such as shape and color of the graphical elements that represent the data objects, the co-ordinates of the graphical elements, the format of the graphical representation (e.g., depending on whether the map or the graph application is providing the data objects), the background, associated texts, etc., while a state of representation can be associated with a state of these information. The attributes of the graphical element (e.g., shape, color, etc.) of the data object can also be related to the data represented by the data object. Interface module 354 can generate the state of representation of the data objects, or acquire the state from other sources including, for example, application 312, or from other storage sources as discussed below.

Client interface module 354 can also acquire a manipulation of the representation of the data objects via application data interface 352a, and update the rendering in real-time. For example, interface module 354 can acquire a user's action within interface 352a. Such action can include but is not limited to an activation of a data object (e.g., a selection), an action to move a graphical element representing the data object to a different location, an action to navigate and zoom into another portion of the graphical representation, an action to invoke another application, and/or an action to open another interface separate from the first interface for a separate graphical representation of the same or other data objects, etc. Based on the acquired action, interface module 354 can update the data for rendering the data objects and provide the data to interface 352a. Also, if, as a result of the manipulation, more data objects are to be displayed via interface 352a, interface module 354 can also provide a request for the additional data objects to application 312. Interface module 354 can also acquire an editing of the data objects (e.g., editing of the attribute(s) and/or propertie(s) of the data objects) via application data interface 352a, and synchronize the editing with server 310. Exemplary systems and methods for synchronizing changes to the data objects are described in U.S. patent application Ser. No. 13/922,437, entitled "System and Method for Incrementally Replicating Investigative Analysis Data," filed Jun. 20, 2013; U.S. patent application Ser. No. 14/076,385, entitled "Assisting in Deconflicting Concurrent Conflicts," filed Nov. 11, 2013; and U.S. patent application Ser. No. 14/156,208, entitled "Cross-Ontology Multi-Master Replication," filed Jan. 15, 2014, the entire contents of which are expressly incorporated herein by reference for all purposes. In some embodiments, interface module 354 can also provide content data of the document or presentation to be rendered in content interface 352b, and update the content data (and/or the representation of it) after acquiring a manipulation of the data via content interface 352b.

Client device 350 can also include data storage unit 356. Data storage unit 356 can be any non-volatile storage device, such as hard drive, flash memory, etc. In some embodiments, storage unit 356 can be used to store information about a first representation state 356a, which can then be provided to interface module 354 to generate the data for rendering a graphical representation of data objects 332 via application data interface 352a. In some embodiments, state 356a can be associated with a first timestamp. The first timestamp can represent, for example, the time at which a user last requested to store the representation of data objects 332. Storage unit 356 can also store information about a second representation state 356b, which can also be provided to interface module 354 to generate the data for rendering data objects 332 via application data interface 352a. In some embodiments, state 356b can be associated with a second timestamp. The second timestamp can represent, for example, the time at which the user last manipulated (without requesting to store) the representation of data objects 332. Therefore, state 356b can be used to store and to track the most up-to-date representation state of the data objects, allowing application data interface 352a to interactively render the data objects in response to user's manipulation in real-time. In some embodiments, data storage unit 356 can be used to store states associated with other timestamps (not shown in FIG. 3A), which can allow the user to track the changes to the representation state of the data objects.

As shown in FIG. 3A, data storage unit 356 can also be used to store local data 356c, which can include, but is not limited to, the content data to be rendered via content interface 352b, local copy of edited data object 332 for later synchronization, etc. In some embodiments, local data 356c and at least one of states 356a and 356b can be stored as part of a data file associated with the document or the presentation slides, and the data file can be shared by, for example, emailing as an attachment, or stored in a depository where other users can access.

FIG. 3B is a chart illustrating an exemplary application data object 363, consistent with embodiments of the present disclosure. Data object 363 can have similar features as data object 323 as shown in FIG. 3A. Data object 363 can include an object ID field 363a that is associated with a value, for example 123456, and an object type field 363b that is associated with a text string, for example "human." Object ID can be used to identify the data object and can be used to refer to the data object by, for example, a state of representation as discussed before. Object 363 can also include a property type field 363c, a property value field 363d, and an access control field 363e. As shown in FIG. 3B, data object 363 can be associated with a plurality of property types, each property type being associated with a value and an access control policy. For example, data object 363 as shown in FIG. 3B can be associated with a human being whose name, as indicated by the value associated with the name property type, is John. The name property type is also associated with a display-only access control policy, meaning that a user who accesses data object ID 123456 can only view the name property type of the data object. Other property types of data object ID 123456 can be associated with different values and different access control policy. For example, the profession property type of data object ID 123456, as shown in FIG. 3B, is inaccessible, meaning that the value associated with this particular property type will not be available for displaying and/or editing, whereas the language property type of the same data object is available for both displaying and editing.

In some embodiments, the access control policy for each property type of the data object can be determined by the access control list (e.g., access control list 334 of FIG. 3A) associated with the data object. For example, the access control list can include a list of users, and indicate the access rights with respect to each property type for each user. After verifying the identity of the user who is accessing the data object (via, for example, authentication module 318), the user's access rights information associated with the data object can be retrieved and provided, together with the data object, to interface module 354 of the client device. Interface module 354 can then control the user's access to the data object, via client interface 352, according to the access right information.

Figure 4A:
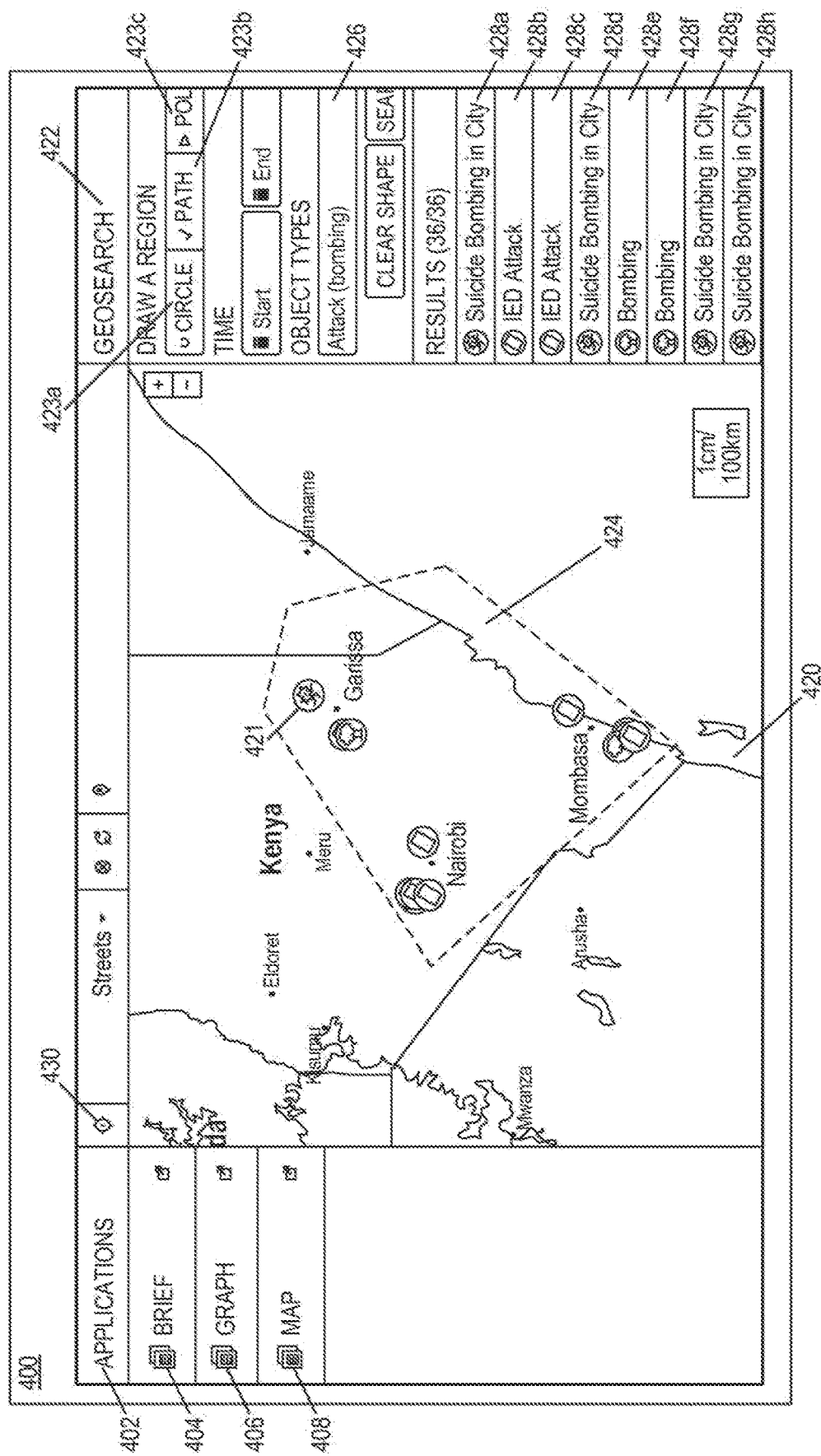
FIGS. 4A-4G represent exemplary interfaces for accessing and representing application data objects, consistent with embodiments of the present disclosure.

FIGS. 4A-4G represent exemplary interfaces 400 for accessing and representing application data objects, consistent with embodiments of the present disclosure. Interface 400 can include similar features as client interface 352 of FIG. 3A, and can be supported by interface module 354 of FIG. 3A. Interface 400 can include an applications menu 402, which provides options 404, 406, and 408. A user can activate option 404 to invoke a brief application, option 406 to invoke a graph application, and option 408 to invoke a map application. In some embodiments, the graph application and the map application can provide data to facilitate graphical representations, in a graph format and a map format respectively, of one or more data objects. Although FIG. 4A shows that a graph application and a map application are accessible via applications menu 402, it is appreciated that other applications providing visual representation of information can be accessed via exemplary interface 400, such as a web browser, a document viewer, etc. As discussed later, the brief application can provide access to a document (e.g., a presentation slide), as well as access to a representation of the data objects either facilitated by the graph application or by the map application. In some embodiments, at least one of these applications are hosted remotely, similar to application 312 being hosted on server 310 of FIG. 3A.

As shown in FIG. 4A, the map application can be invoked in interface 400, after the brief application is invoked. In this exemplary illustration, the map application can display, via interface 400, a map 420 to represent a distribution of one or more data objects, including data object 421, within a specific geographical region, in this case part of Eastern Africa with Kenya in the middle. In this particular example, the data objects can be related to information about terroristic activities associated with a particular location as indicated in map 420. Map 420 can also indicate, via box 443, that the map is rendered with a scale of 1 cm/100 km. The representation of the distribution can be generated via a geosearch menu 422. Geosearch menu 422 can include a circle option 423a, a path option 423b, and a polygon option 423c, with each option indicating a mode of selecting a region displayed in the map. In some embodiments, as shown in FIG. 4A, after the polygon option is selected, the application allows the user to draw a polygon 424 on the map, the boundary of the polygon defining the region being selected. The application then allows the user to search for one or more data objects associated with the selected region, based on specific search criteria. For example, a user can select, in field 426, an object type associated with "attack (bombing)." Based on this search criterion, a list of object types 428a-428h, each with properties related to the object type "attack (bombing)," can be displayed. Data objects with the listed object types, including data object 421, can be shown as highlighted spots in map 420.

Interface 400 also provides an add button 430. Activating add button 430 can create an artifact, which captures a state of the representation of the data objects in map 420, which can include information such as an indicator associated with the map application, the geographical location of map being displayed (e.g., Eastern Africa, with Kenya in the middle), the representation scale of the map (1 cm/100 km), and the list of data objects selected for displaying, at the time when add button 430 is activated. Activating add button 430 can also allow the user to switch back to the brief application.

Figure 4B:
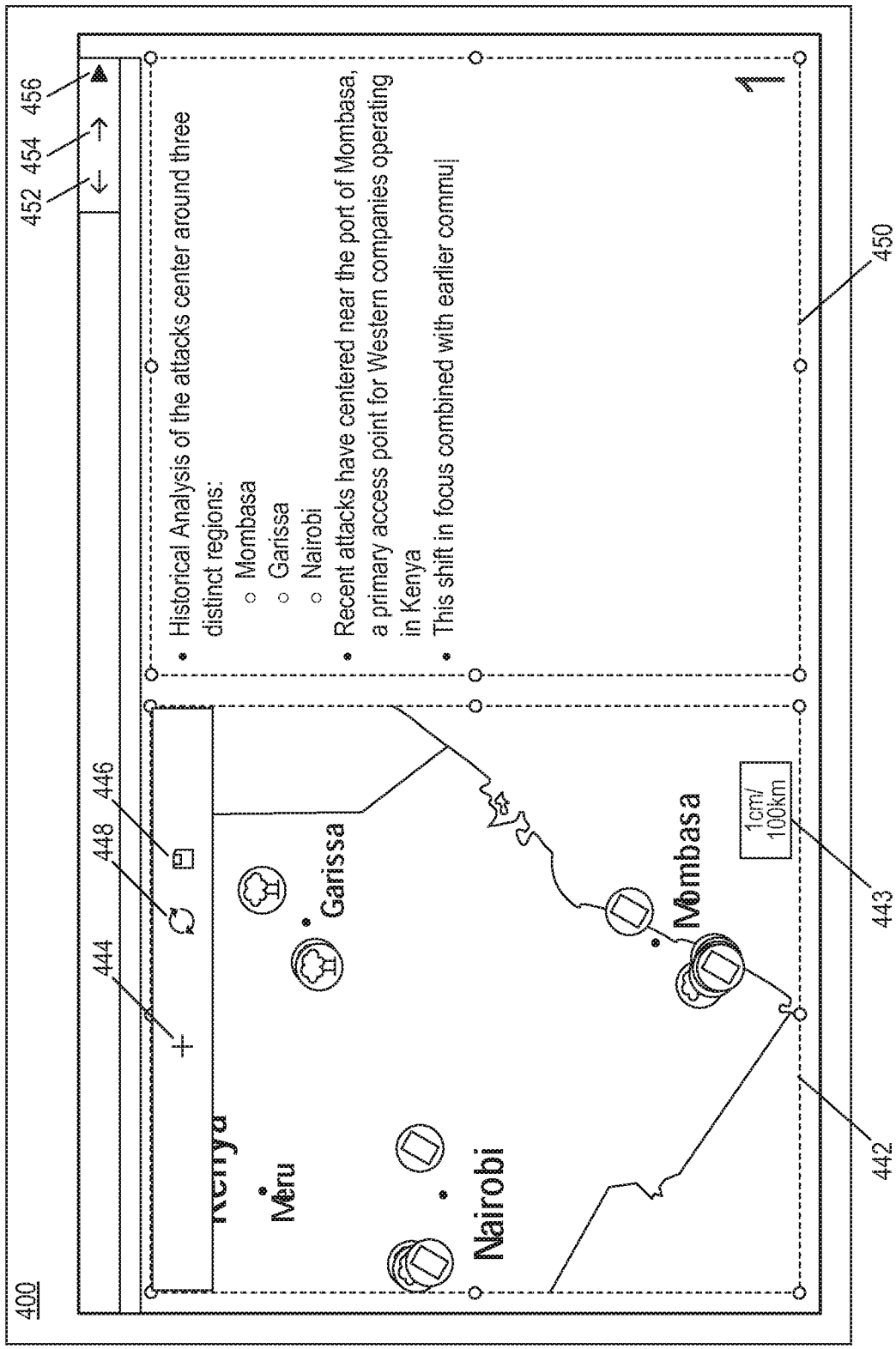

After selecting add button 430, the user can "drop" the artifact into a visual representation of one or more contents of a document file, where the representation is provided by the brief application via interface 400. Such a document file can be a Microsoft Word™ document, a Microsoft PowerPoint™ presentation slide, or of any other format including content that can be visually represented. Throughout this disclosure, a presentation file, which includes data for one or more presentation slides, is used as an illustrative example. As shown in FIG. 4B, interface 400 provides, as part of a representation of a presentation slide, an interface 442 and an interface 450. The artifact associated with the map application can be displayed via an interface 442, and the state of representation can cause the display to focus on the same geographical region, with the same scale (indicated via box 443), and the same selected data objects being displayed as in FIG. 4A, according to the state of the representation created following the activation of add button 430 in FIG. 4A. Interface 442 can be implemented as application data interface 352a of FIG. 3A. Interface 442 can allow a user to manipulate the representation of the data objects by, for example, dragging the displayed map to shift to a different geographical location, zooming into or out of a particular area, etc., thereby changing the scale of representation and the list of data objects displayed, etc.

Interface 442 also provides a maximize button 444, a save button 446, and a restore button 448. After activation of maximize button 444, interface 442 can expand within interface 400, as shown in FIG. 4D. In some embodiments, interface 442 allows a user to alter the information displayed, for example, by receiving input that shifts the displayed map to a different geographical location, thereby altering the representation state of the one or more data objects. The ability to dynamically manipulate the representation of data objects shown in interface 442 can be useful for a user when presenting information to an audience having questions that may be unpredictable. For example, by having the ability to expand interface 442, the presenter can access additional features of the application or display additional data objects to manipulate the representation of the data objects, and can easily switch back to the presentation mode when the manipulation is finished, so that the manipulated data objects can be represented as part of the representation of the presentation slide. Besides, after activation of save button 446, the manipulated state of representation can be stored and can overwrite the state of representation at the time add button 430 of FIG. 4A is activated. On the other hand, activation of restore button 448 can lead to restoring of the state of the representation back to the time when add button 430 of FIG. 4A is activated.

Referring back to FIG. 4B, Interface 450 allows the user to put in other content of the presentation slide, including text, graphics, or any other data objects. In some embodiments, interface 450 allows a user to perform Rich Text Format editing. As shown in FIG. 4B, the boundary of the interfaces 450 and 442 can be delineated via dotted lines. Interface 400 also provides forward button 452 and backward button 454, both of which can allow a user to navigate between the presentation slides. Interface 400 further provides a slide-show button 456, which can allow a user to enter the aforementioned presentation mode with interface 400.

Figure 4C:
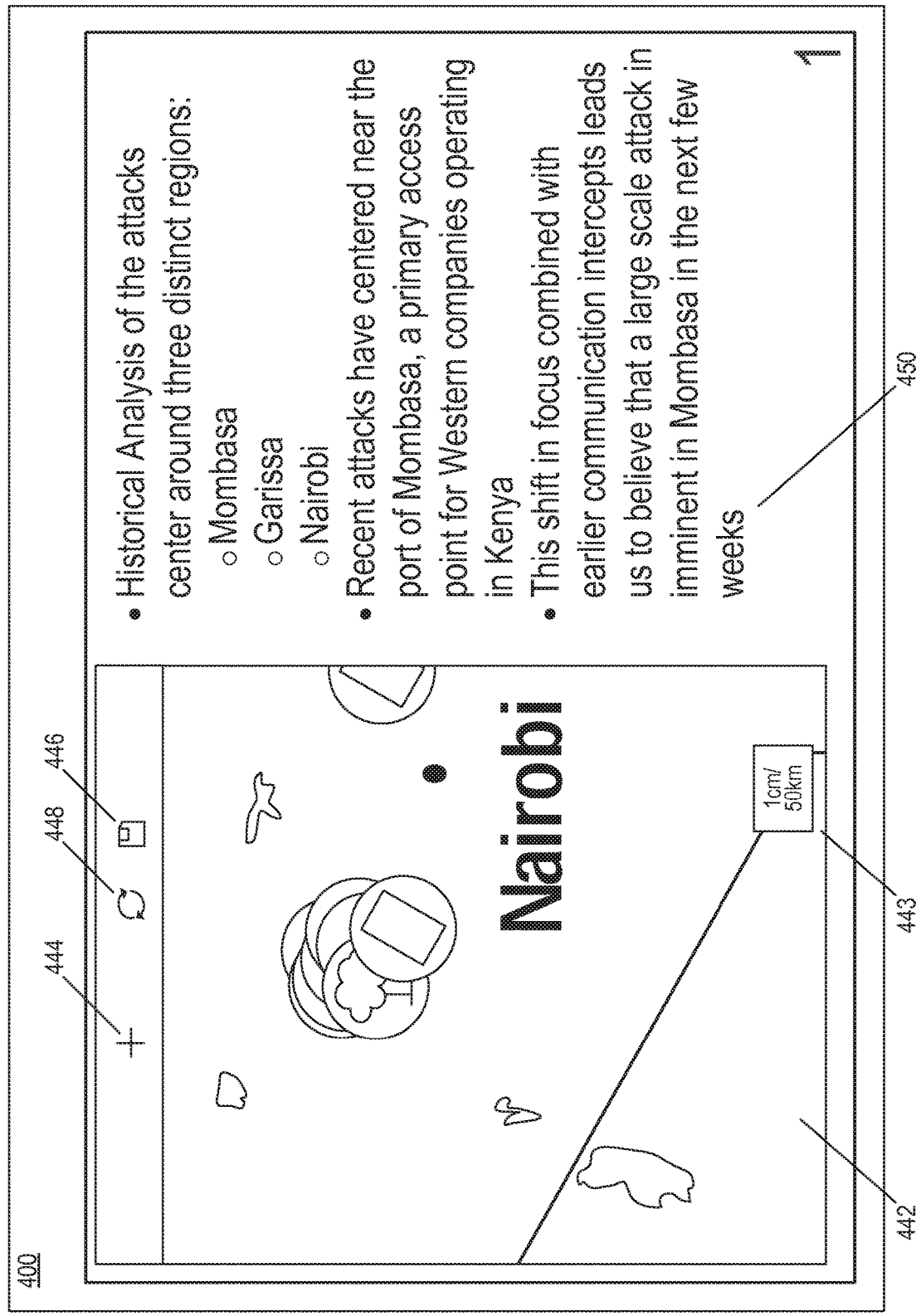
Figure 4D:
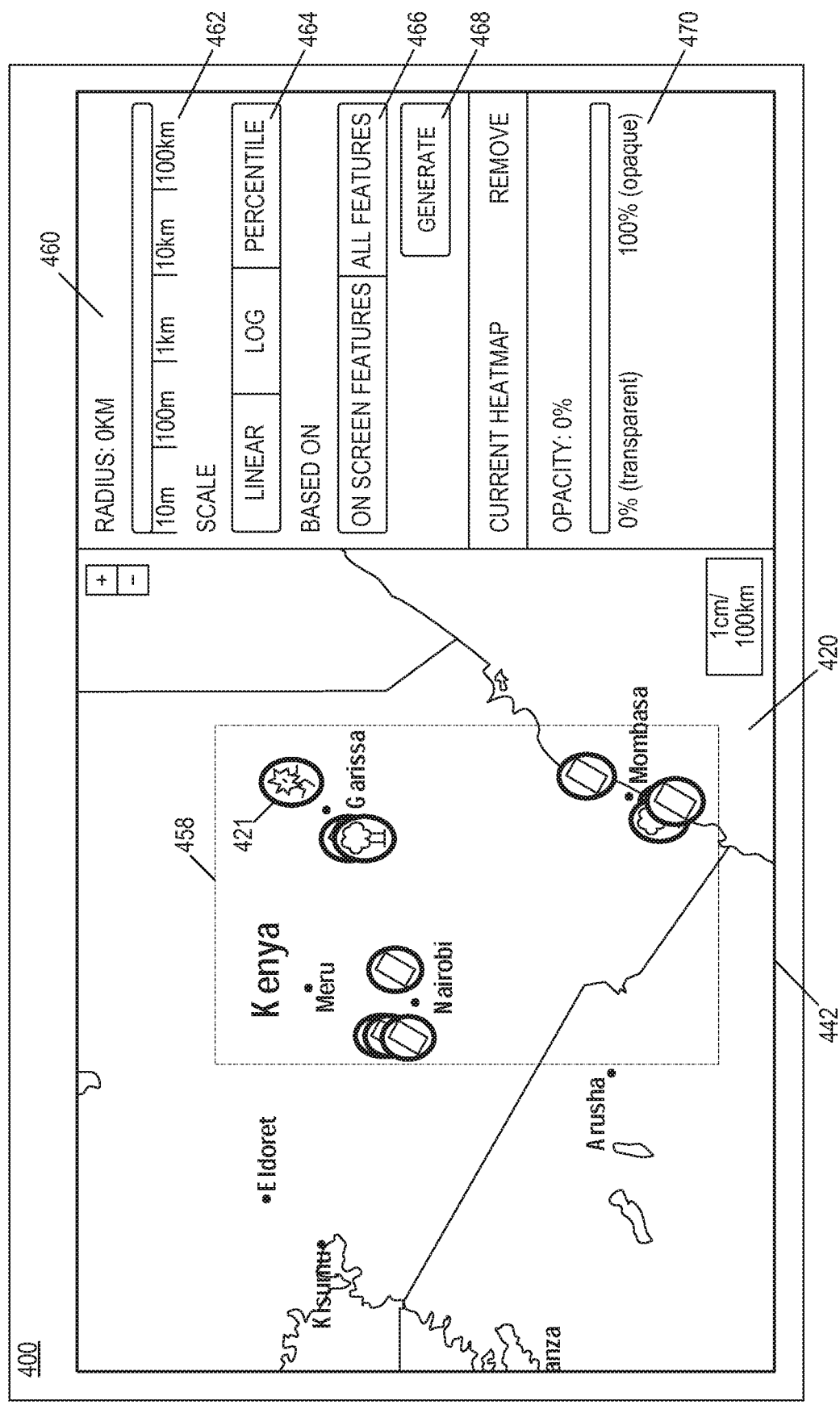

FIG. 4C depicts an exemplary presentation mode with interface 400 consistent with embodiments of the present disclosure, after the user activates slide-show button 456 as shown in FIG. 4B. In some embodiments, the presentation mode provides a representation of the presentation slides in a slide show manner. During the presentation mode, both interfaces 442 and 450 can be provided, but with the dotted-line boundaries removed from displaying. During the presentation mode, interface 450 can display a state of the content (e.g., text, graphics, etc.) of a presentation slide based on user's activation of slide-show button 456 to activate the presentation mode. Interface 442, on the other hand, remains capable of allowing the user to manipulate the representation of the data objects during the presentation mode. For example, as shown in FIG. 4C, interface 442 allows the user to shift the displayed map, to zoom in to or out of a specific area within the map (e.g., changing the scale from 1 cm/100 km to 1 cm/50 km as shown in box 443), and to select one or more data objects, during the presentation mode.

Figure 4E:
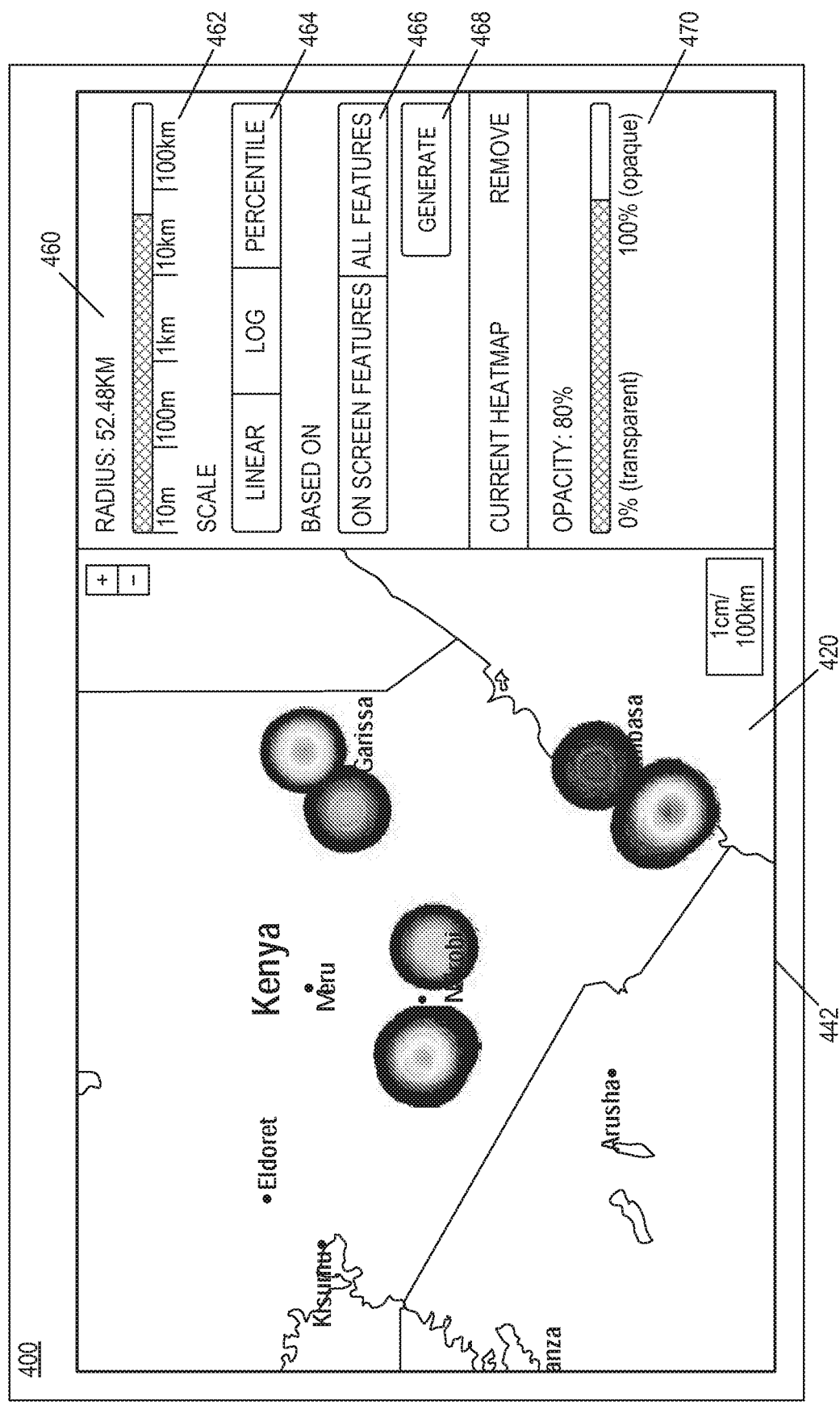

FIGS. 4D-4E depict an exemplary expansion of interface 442 after maximize button 444 is activated, consistent with embodiments of the present disclosure. Maximize button 444 can be activated during the presentation mode, or in other time when the slide is being created or edited. The expanded interface 442 can allow the user to access other features of the application (e.g., starting a new analysis to acquire a different set of data and/or a different representation of data), which may not otherwise be accessible before the interface expands. In this exemplary illustration, as shown in FIG. 4D, the expanded interface 442 displays map 420, which depicts a similar part of Eastern Africa as in FIG. 4A. The expanded interface 442 allows a user to select one or more data objects, including data object 421, to start a new analysis based on the selected data objects, by drawing a line 458 around the data objects. Line 458 can form a rectangle, as shown in FIG. 4D, or any shape. The selected data objects can become highlighted at the boundary to indicate the selected portion. In the illustrative example as shown in FIG. 4D, a distribution of a pre-defined activity (e.g., "attack (bombing)") chosen in interface 400 as shown in FIG. 4A), within a pre-defined radius, can be generated around the locations associated with the selected data objects. The distribution can be represented as a circular heatmap centered around each location, with different colors representing, for example, a density of the distribution. The density of the distribution can be part of the data represented by the data objects, which can then be used to change the attributes (e.g., color) of the graphical elements representing the data objects, as discussed before.

Interface 442 can also provide a menu 460. Menu 460 can include a slider 462 to define the radius for which the distribution is selected for representation, options 464 to define a scale based on which the distribution is represented, options 466 to choose a feature whose distribution is to be represented (e.g., to represent the distribution of "attack (bombing)" as chosen in FIG. 4A, or to represent the distribution of other activities), and a generate button 468, which is activatable to generate the heatmap based on the aforementioned settings. Menu 460 can further include a slider 470, which can allow the user to define the opacity of the circular heatmap as to be displayed in map 420. FIG. 4E depicts a generation of the circular heatmaps after the user selects a radius of 52.48 km using slider 462 and opacity of 80% using slider 470. In some embodiments, the generation of the circular heatmaps in FIG. 4E can be part of the launching of a new investigation based on map 420.

As the user manipulates the representation of the data by, for example, zooming into a specific map area (as shown in FIG. 4C), expanding the displayed map area and the associated data objects (as shown in FIG. 4D), or requesting for another representation of the data objects (also as shown in FIG. 4D), a change in state of representation can be detected and tracked. For example, interface module 354 of FIG. 3A can track the changes, and send a request to server 310 to receive data to affect the change in the representation. In some embodiments, after detecting that the interface 442 is expanded, and that more data objects are represented, interface module 354 can send a request to server 310 for more data (e.g. an enlarged size of sample data 236) to support the representation of the additional data objects. In some embodiments, the user can also modify the data represented by, for example, adding or removing data objects, adding in other additional data components associated with the data objects, etc., via the expanded interface 442, and the state of representation can capture all these changes. The user can then click on save button 446 to store the state of the representation in the presentation file. As a result, the representation of the data objects (or any changes thereof) can be moved or copied from one file to another, and the data objects can become accessible via different document files, as long as each file stores a state of representation of the data objects.

Figure 4F:
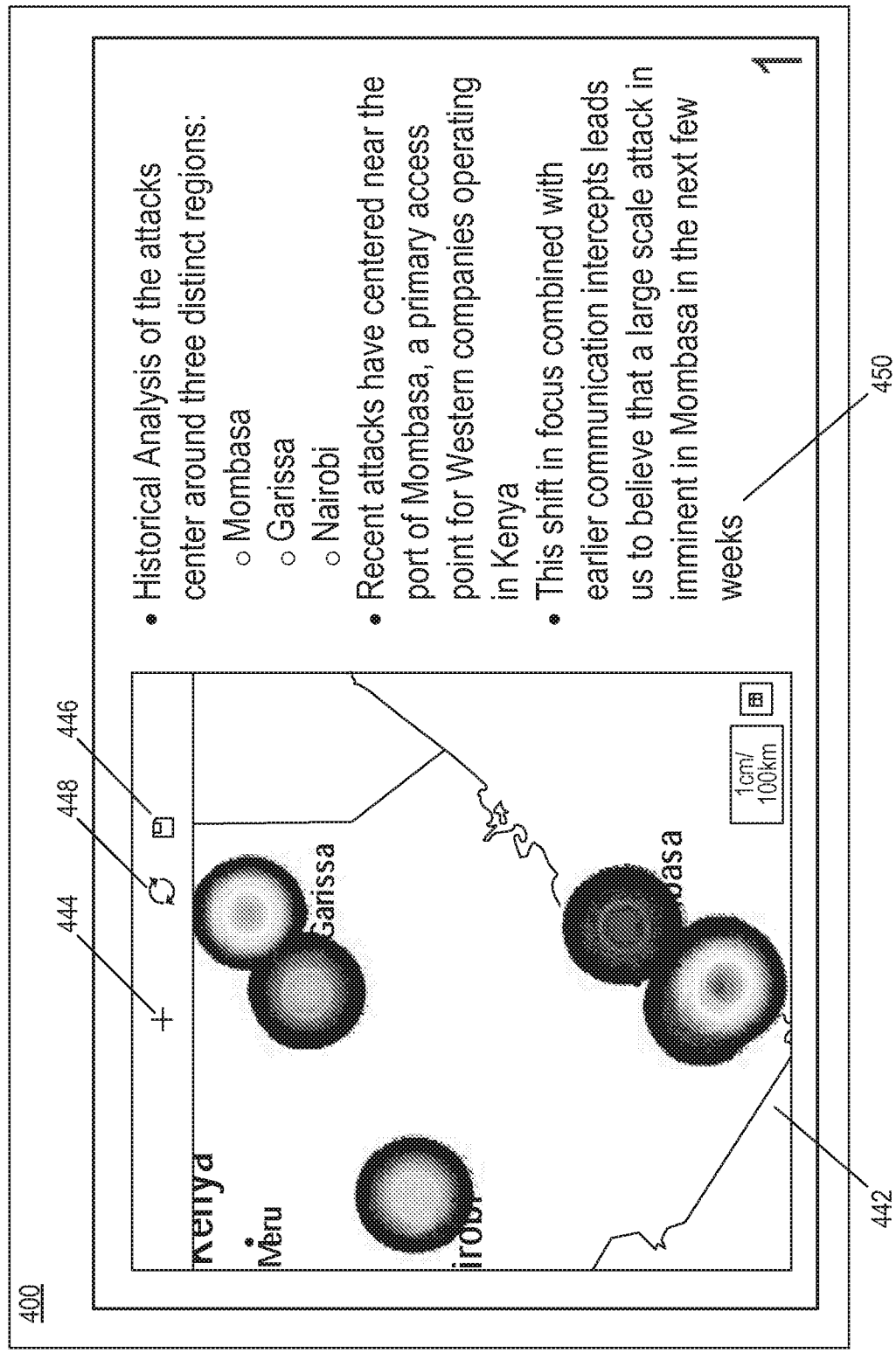
Figure 4G:
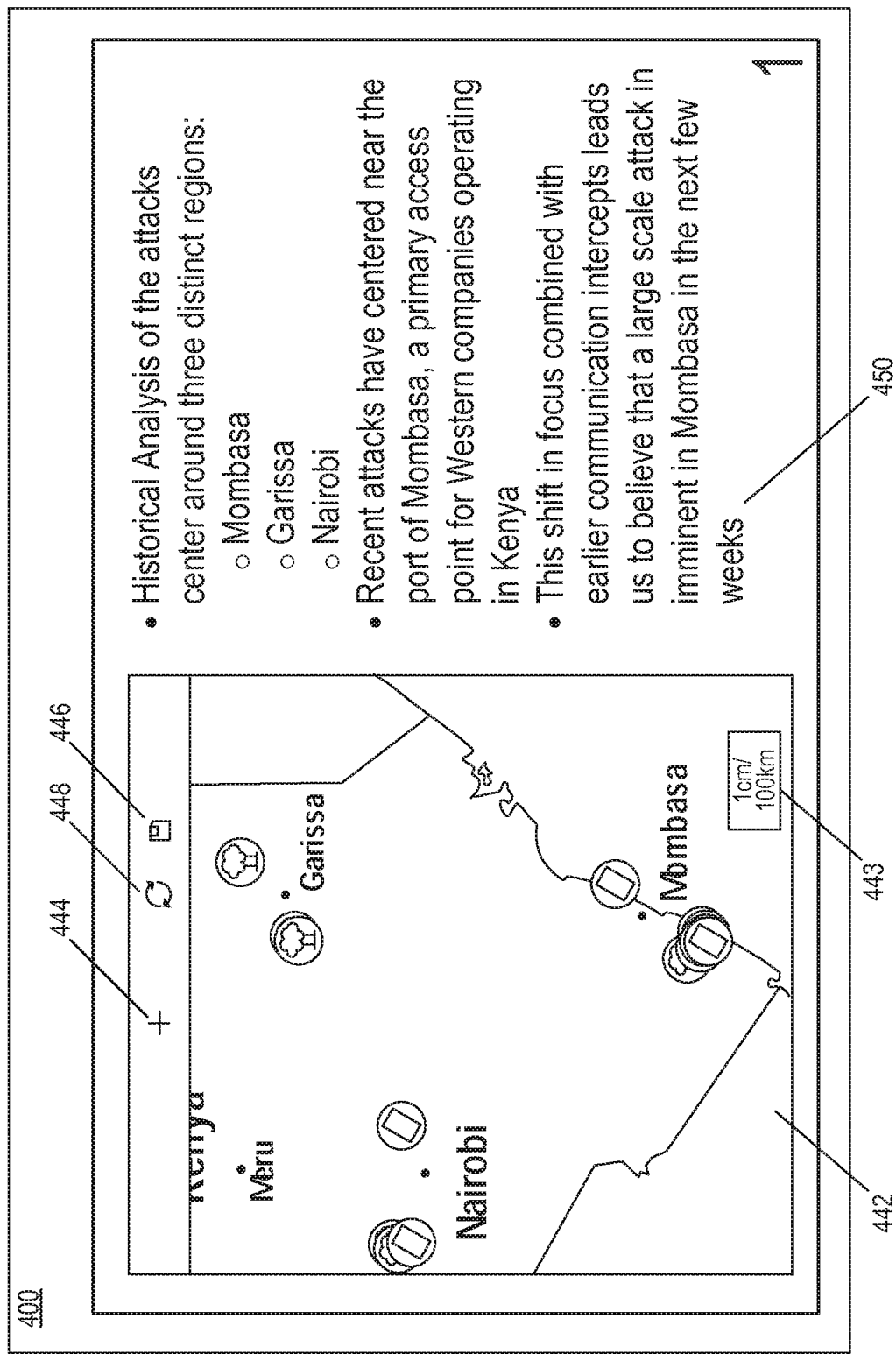

FIG. 4F depicts an exemplary presentation mode with interface 400 consistent with embodiments of the present disclosure, after interface 442 has been restored from its expanded form in FIG. 4E. As shown in FIG. 4F, interface 442 maintains a state of the representation of the data objects (e.g., distribution of events in the form of heatmaps, zoomed-in geographical location, etc.) right before the expanded interface 442, as shown in FIG. 4E, is restored. This allows the presenter to use the new information obtained via the expanded interface 442 for the presentation. The presenter can also activate restore button 448 to switch back to an earlier representation of the data objects, as shown in FIG. 4G.

Figure 5A:
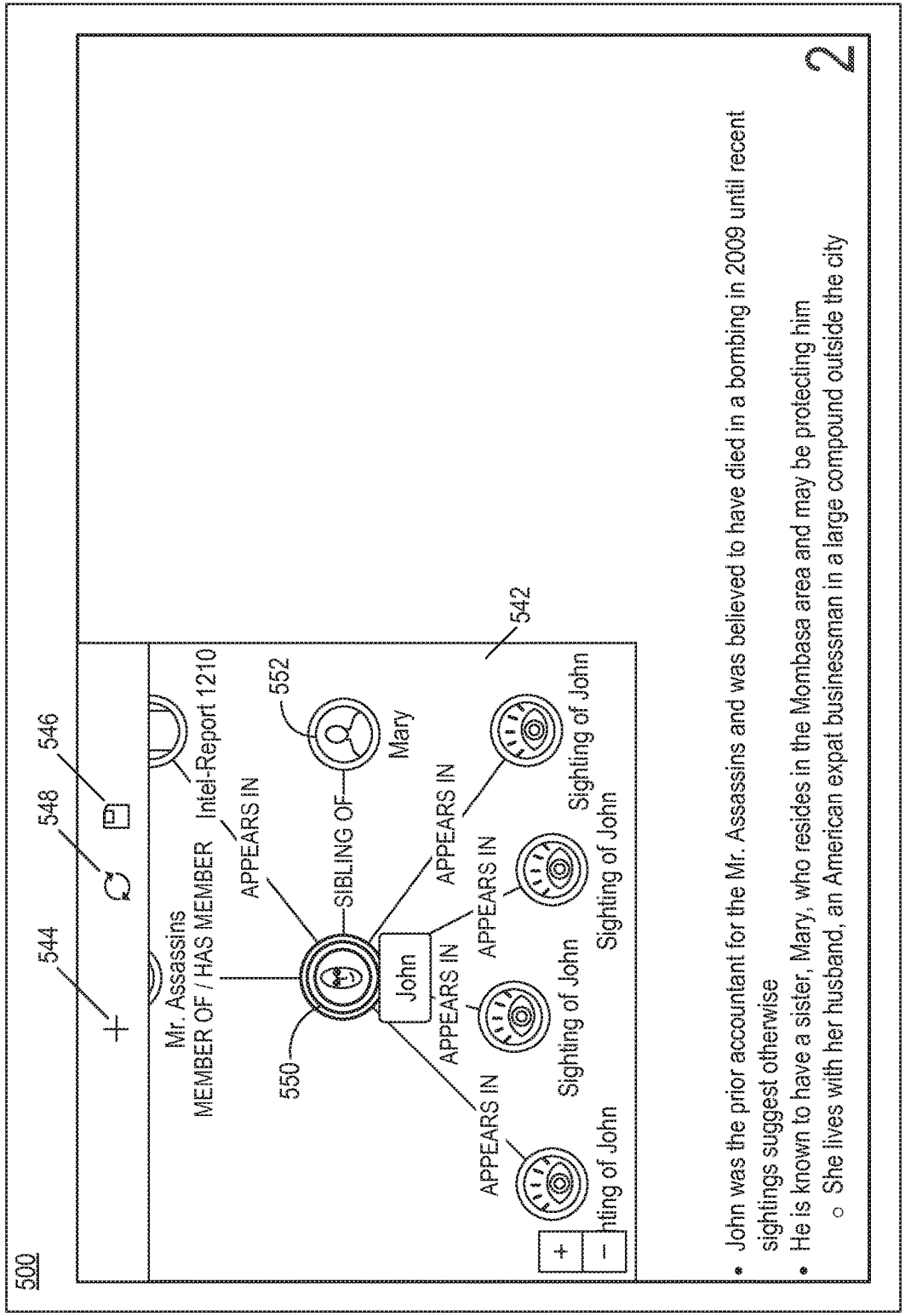
FIGS. 5A-5B represent exemplary interfaces for accessing and representing application data objects, consistent with embodiments of the present disclosure.
Figure 5B:
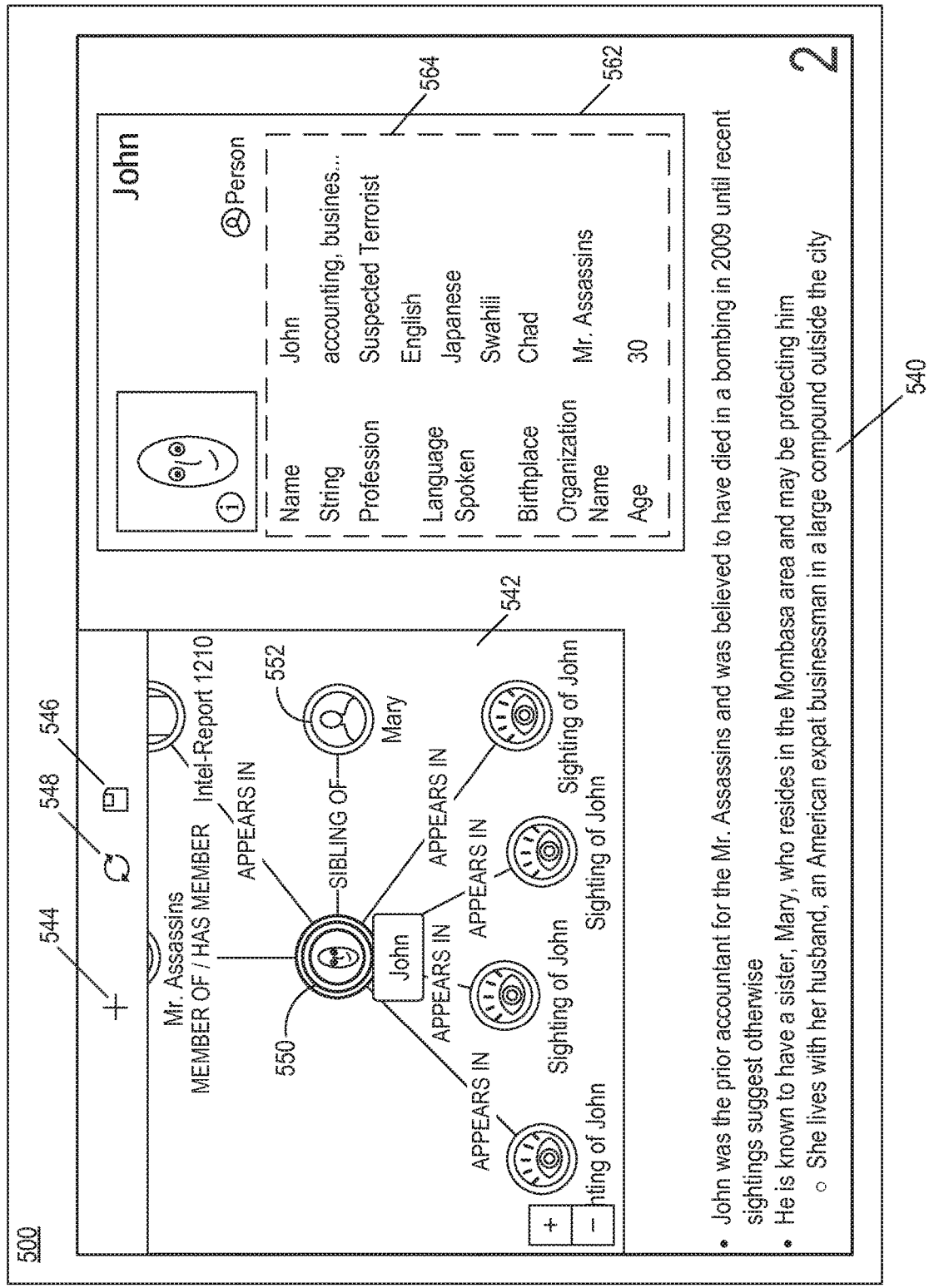

FIGS. 5A-5B represent an exemplary interface 500 for accessing and representing application data objects, consistent with embodiments of the present disclosure. Interface 500 can include similar features as interface 400 of FIGS. 4A-4F as well as client interface 352 of FIG. 3A, and can be supported by interface module 354 of FIG. 3A. As shown in FIG. 5, the brief application can be invoked in interface 500 to provide access to a presentation slide, and to represent the presentation slide in the presentation mode as discussed earlier. Interface 500 also includes an interface 542 through which the graph application can be accessed after, for example, option 406 of FIG. 4A is activated. Interface 542 can also provide maximize button 544, save button 546, and restore button 548, which can have similar functionalities as, respectively, maximize button 444, save button 446, and restore button 448 of interface 442. Facilitated by the graph application, interface 542 can provide a graph representation of one or more data objects, including data object 550 and data object 552 as shown in FIG. 5A. In this exemplary illustration, each data object is associated with a person, and the graph representation depicts a relationship between each data object. For example, data object 550 is associated with a person whose name is "John" and data object 552 is associated with a person whose name is "Mary," and the two data objects are related by virtue of, for example, the fact that John and Mary are siblings.

FIG. 5B illustrates an exemplary interface 562, which can be invoked, via interface 542, to display data associated with a data object shown in interface 542. As shown in FIG. 5B, interface 562 displays data 564 associated data object 550 shown in interface 542. In some embodiments, interface 562 can be provided by invoking another application separate from the graph and the map applications. In some embodiments, interface 562 can be provided after an embedded application associated with the data objects represented in interface 542, executes as a result of a user's activation of the data objects, or any other activatable features rendered in interface 542. For example, interface 562 can be provided by selecting object 550, or dragging the selected object 550 towards a location outside interface 542, to put interface 562 at that location or by selecting object 550. In some embodiments, upon detecting an activation of the data objects, interface module 354 can provide interface 562, and can send request to server 310 to receive data for representing the properties in interface 562.

In some embodiments, the data objects shown in interface 542 include similar features as the exemplary data object shown in FIG. 3A, and include one or more properties. The data 564 displayed in interface 562 can include a textual representation of one or more property types, and the corresponding property values. In some embodiments, the scope of property types (as well as the corresponding property values) displayed can be controlled by the access control policy associated with each property type of the data object. Depending on the identity of the presenter (or the user who is accessing the data object via interfaces 542 and 562), one or more property types can be made inaccessible by, for example, data processing module 314 after the user's identity is authenticated by authentication module 318 as shown in FIG. 3A, and the inaccessible property types are not shown in interface 562 accordingly.

Figure 6:
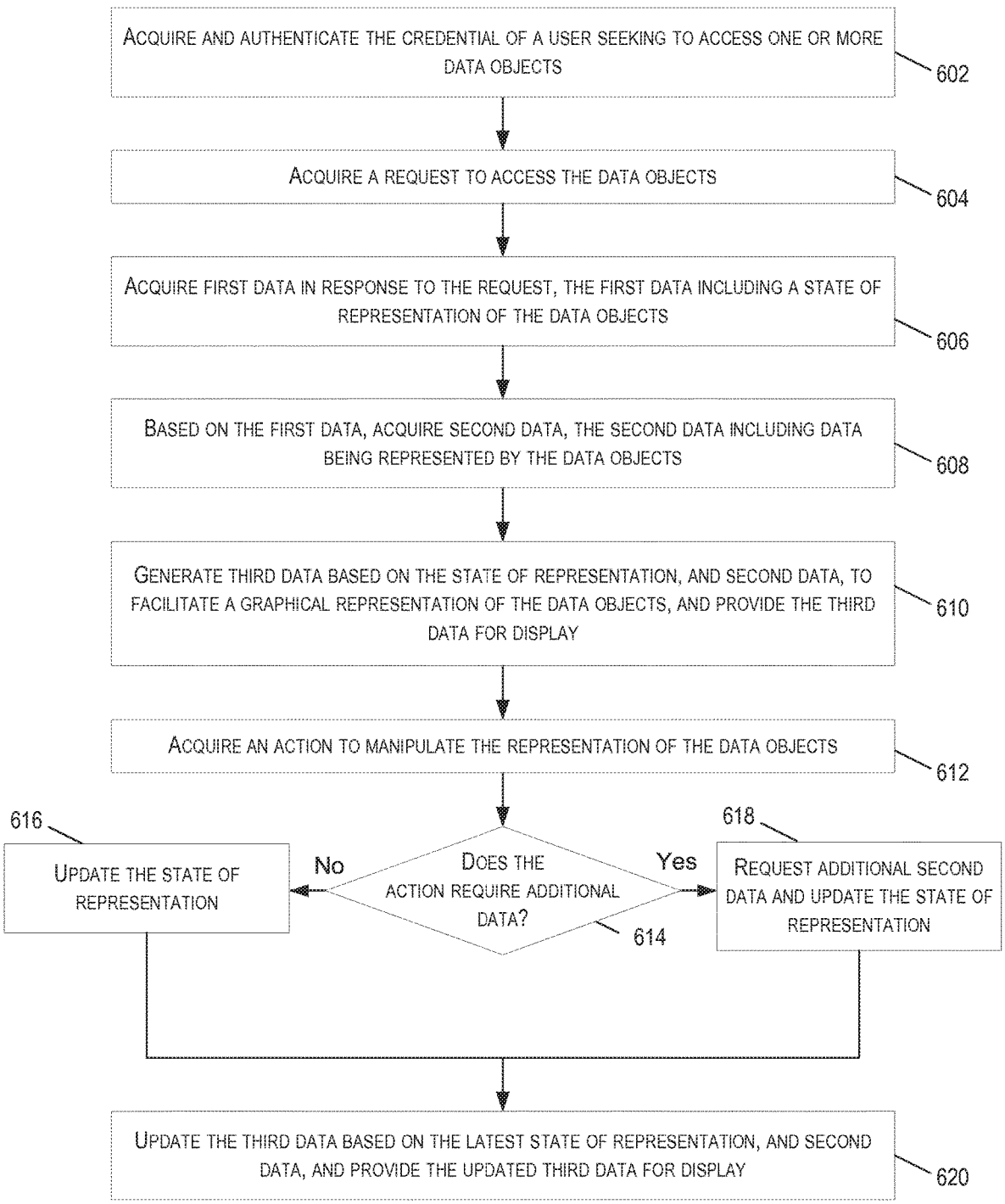
FIG. 6 is a flowchart representing an exemplary method performed by an electronic device for accessing and representing application data objects, consistent with embodiments of the present disclosure.

FIG. 6 is a flowchart representing an exemplary method 600 performed by an electronic device for accessing and representing application data objects, consistent with embodiments of the present disclosure.

In this exemplary illustration, the electronic device (e.g., client device 350 of FIG. 3A) can interact with one or more other devices and/or storage components (e.g., server 310 and database 330 of FIG. 3A) for assisting with the representation of one or more data objects (e.g. data object 332 of FIG. 3A). While the flowchart discloses the following steps in a particular order, it will be appreciated that at least some of the steps can be moved, modified, or deleted where appropriate, consistent with the teachings of the present disclosure. And while the following steps are indicated as being performed by an electronic device, it is appreciated that the steps can be performed by more than one electronic device.

In step 602, the electronic device acquires and authenticates the credential of a user who seeks to access one or more data objects, to establish an identity of the user. The data objects can be data object 332 provided by, for example, application 312 hosted on server 310 as shown in FIG. 3A. The authentication can occur when the user seeks to also access a document file via, for example, an interface (e.g., interface 400 of FIG. 4A and interface 500 of FIG. 5A). In some embodiments, the acquisition and authentication of the credential may not be required.

In step 604, after establishing the identity of the user, the electronic device acquires a request to access the data objects from the user. For example, as shown above, the request can be made via a sub-interface (e.g., interface 442 of interface 400). The request to access the data objects can be acquired by, for example, detecting a display of interface 442 of FIG. 4B and/or interface 542 of FIG. 5A, and/or detecting a pointer movement across or within interface 442 and/or interface 542.

In step 606, the electronic device acquires, in response to the request, data associated with an artifact that is configured to be displayed in interface 442. The artifact can include a collection of data used to facilitate a displaying of the data objects via interface 442. The representation can be graphical and/or textual. In some embodiments, the artifact can include, for example, an identifier for an application (e.g. application 312 of FIG. 3A) that provides the data objects, a list of data objects to be represented, and any other information pertinent to the graphical rendering of the data objects, such as shape and color of the graphical elements that represent the data objects, the co-ordinates of the graphical elements, the format of the graphical representation (e.g., depending on whether the map or the graph application is providing the data objects), the background, associated texts, etc., while a state of representation can be associated with a state of these information. The attributes of the graphical element (e.g., shape, color, etc.) of the data object can also be related to the data represented by the data object. The data associated with the artifact can be acquired from the document file, or from other data sources. For example, in instances where authentication of credentials is necessary, the graphical element may be acquired from data sources outside of the document file. The state of representation can be regarded as the first state of representation associated with a first timestamp.

In step 608, after acquiring the data associated with the artifact, the electronic device acquires the data being represented by the data objects from a second device, based on the artifact information. The data being represented by the data objects can include, for example, the data about a distribution of a pre-defined activity within a pre-defined radius around the locations associated with the data objects, as shown in FIG. 4A, or relationship between a group of people represented by the data objects, as shown in FIG. 5A. The data being represented by the data objects can also include one or more property types associated with the data objects, and the corresponding property values. The scope of the property data acquired can be based on the established identity of the user seeking to access the data objects according to step 602. In some embodiments, the data objects can have similar attribute as data object 363 of FIG. 3B, where the properties associated with the data objects can also be associated with one or more access control policies, specified in field 363e, governing access right to the properties by the user. The property data can then be pre-filtered based on the access control policies before it is acquired by the electronic device.

In step 610, the electronic device displays the artifact. Optionally, to facilitate the display, the electronic device modifies or generates additional data associated with a local display of the artifact at the electronic device. The additional data can include, for example, the display co-ordinates of the graphical elements, data supporting the graphical representation (e.g., depending on whether the map or the graph application is providing the data objects), the background, etc., that are customized for the display at the electronic device.

In step 612, the electronic device acquires an action from the user to manipulate the representation of the data objects. Such action can be detected via any pointer movement within, for example, interfaces 442 and 542, and include but is not limited to a selection of a data object, an action to move a graphical element representing the data object to a different location, an action to navigate and zoom into another portion of the representation, an action to invoke another application, and/or an action to open additional interface (e.g., interface 562 of FIG. 5B) for a separate representation of the same or other data objects. For example, the electronic device can detect an activation of data object 550 as shown in FIG. 5A by, for example, detecting a selection and/or "dragging" movement of data object 550 within interface 542. Such a movement may indicate that the user attempts to access the properties of data object 550 via a separate interface.

In step 614, the electronic device determines if the acquired action requests for additional data (e.g., additional sample data, additional data objects, invoking a different application, etc.). If the acquired action does not require additional data, the electronic device can carry out step 616 to simply update the state of representation of the currently-rendered data objects by providing, for example, updated graphics, co-ordinates information, etc. If the acquired action requires additional data (e.g. expanding of interface 442 to display a bigger map with more data objects as shown in FIG. 4D, launching of a new investigation as shown in FIG. 4E, etc.), the electronic device can carry out step 618 to request additional data represented by the data objects from the second device, and update the state of representation of the additional data objects and/or the currently-rendered data objects. The electronic device may also store the updated state as a second state of representation associated with the artifact. The second state of representation can be associated with a second timestamp. The electronic device may also receive an instruction to overwrite the first state with the second state.

In step 620, the electronic device displays the modified artifact.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed:

1. A non-transitory machine-readable storage medium, storing instructions which, when executed by at least one processor of a machine, cause the machine to perform operations comprising:
   presenting a graphical user interface that includes a display of a menu element to display a set of object types and a set of selection modes, a slider element to define an opacity value, and a map image at a client device, the map image depicting a geographic region;
   receiving an identification of an object type from among the set of object types presented within the menu element;
   receiving an input that selects a selection mode from among the set of selection modes;
   receiving a selection of a portion of the geographic region depicted by the map image based on the selection mode selected by the input;
   accessing authentication credentials of a user of the client device in response to the selection of the portion of the geographic region;
   determining, based on the authentical credentials and an access control list associated with the object type, a first set of data objects associated with the object type that that the user of the client device is authorized to access, the first set of data objects being a subset of available data objects associated with the object type;
   accessing at least a portion of the first set of data objects associated with the object type that correspond with the portion of the geographic region;
   generating a visual depiction of the at least a portion of the first set of data objects associated with the object type, the visual depiction including a heatmap that represents a distribution of the plurality of data objects within the portion of the geographic region;
   receiving a selection of the slider element, the selection of the slider defining the opacity value of the heatmap, and
   causing display of a presentation of the heatmap within the map image at the client device based on the opacity value.

2. The non-transitory machine-readable storage medium of claim 1, wherein the presenting the graphical user interface that includes the display of the map image at the client device includes:
   receiving a request from the client device, the request including an identification of the geographic region.

3. The non-transitory machine-readable storage medium of claim 2, wherein the identification of the geographic region includes a user input that draws a polygon that defines a boundary of the geographic region within the map image.

4. The non-transitory machine-readable storage medium of claim 2, wherein the graphical user interface includes a scale input interface that comprises a slider element and an axis, a scale of the display of the map image based on a position of the slider element along the axis, and the receiving the request that includes the identification of the geographic region includes:
   receiving an input that moves the slider from a first position to a second position along the axis; and
   scaling the display of the map image based on the second position of the slider along the axis.

5. The non-transitory machine-readable storage medium of claim 1, wherein the accessing the at least the portion of the first set of data objects comprises:
   identifying a server associated with the at least the portion of the first set of data objects; and
   transmitting a request to the server for the at least the portion of the first set of data objects.

6. The non-transitory machine-readable storage medium of claim 1, wherein the plurality of data objects include at least a first data object, the first data object including an object property, and the presentation of the first data object comprises a graphical attribute based on the object property.

7. The non-transitory machine-readable storage medium of claim 1, wherein the plurality of data objects include at least a first data object and a second data object, and the operations further comprise:
   detecting a relationship between the first data object and the second data object based on one or more properties of the first data object and the second data object; and
   presenting a visualization of the relationship between the first data object and the second data object within the presentation of the plurality of data objects.

8. A system comprising:
   one or more processors; and
   a memory storing instructions that, when executed by at least one processor among the one or more processors, causes the system to perform operations comprising:
   presenting a graphical user interface that includes a display of a menu element to display a set of object types and a set of selection modes, a slider element to define an opacity value, and a map image at a client device, the map image depicting a geographic region;

receiving an identification of an object type from among the set of object types presented within the menu element;

receiving an input that selects a selection mode from among the set of selection modes;

receiving a selection of a portion of the geographic region depicted by the map image based on the selection mode selected by the input;

accessing authentication credentials of a user of the client device in response to the selection of the portion of the geographic region;

determining, based on the authentical credentials and an access control list associated with the object type, a first set of data objects associated with the object type that that the user of the client device is authorized to access, the first set of data objects being a subset of available data objects associated with the object type;

accessing at least a portion of the first set of data objects associated with the object type that correspond with the portion of the geographic region;

generating a visual depiction of the at least a portion of the first set of data objects associated with the object type, the visual depiction including a heatmap that represents a distribution of the plurality of data objects within the portion of the geographic region;

receiving a selection of the slider element, the selection of the slider defining the opacity value of the heatmap; and causing display of a presentation of the heatmap within the map image at the client device based on the opacity value.

9. The system of claim 8, wherein the presenting the graphical user interface that includes the display of the map image at the client device includes:

receiving a request from the client device, the request including an identification of the geographic region.

10. The system of claim 9, wherein the identification of the geographic region includes a user input that draws a polygon that defines a boundary of the geographic region within the map image.

11. The system of claim 9, wherein the graphical user interface includes a scale input interface that comprises a slider element and an axis, a scale of the display of the map image based on a position of the slider element along the axis, and the receiving the request that includes the identification of the geographic region includes:

receiving an input that moves the slider from a first position to a second position along the axis; and scaling the display of the map image based on the second position of the slider along the axis.

12. The system of claim 8, wherein the accessing the at least the portion of the first set of data objects comprises:

identifying a server associated with the at least the portion of the first set of data objects; and transmitting a request to the server for the at least the portion of the first set of data objects.

13. The system of claim 8, wherein the plurality of data objects include at least a first data object, the first data object including an object property, and the presentation of the first data object comprises a graphical attribute based on the object property.

14. The system of claim 8, wherein the plurality of data objects include at least a first data object and a second data object, and the operations further comprise:

detecting a relationship between the first data object and the second data object based on one or more properties of the first data object and the second data object; and presenting a visualization of the relationship between the first data object and the second data object within the presentation of the plurality of data objects.

15. A method comprising:

presenting a graphical user interface that includes a display of a menu element to display a set of object types and a set of selection modes, a slider element to define an opacity value, and a map image at a client device, the map image depicting a geographic region;

receiving an identification of an object type from among the set of object types presented within the menu element;

receiving an input that selects a selection mode from among the set of selection modes;

receiving a selection of a portion of the geographic region depicted by the map image based on the selection mode selected by the input;

accessing authentication credentials of a user of the client device in response to the selection of the portion of the geographic region;

determining, based on the authentical credentials and an access control list associated with the object type, a first set of data objects associated with the object type that that the user of the client device is authorized to access, the first set of data objects being a subset of available data objects associated with the object type;

accessing at least a portion of the first set of data objects associated with the object type that correspond with the portion of the geographic region;

generating a visual depiction of the at least a portion of the first set of data objects associated with the object type, the visual depiction including a heatmap that represents a distribution of the plurality of data objects within the portion of the geographic region;

receiving a selection of the slider element, the selection of the slider defining the opacity value of the heatmap; and causing display of a presentation of the heatmap within the map image at the client device based on the opacity value.

16. The method of claim 15, wherein the presenting the graphical user interface that includes the display of the map image at the client device includes:

receiving a request from the client device, the request including an identification of the geographic region.

17. The method of claim 16, wherein the identification of the geographic region includes a user input that draws a polygon that defines a boundary of the geographic region within the map image.

18. The method of claim 16, wherein the graphical user interface includes a scale input interface that comprises a slider element and an axis, a scale of the display of the map image based on a position of the slider element along the axis, and the receiving the request that includes the identification of the geographic region includes:

receiving an input that moves the slider from a first position to a second position along the axis; and scaling the display of the map image based on the second position of the slider along the axis.

19. The method of claim 15, wherein the accessing the at least the portion of the first set of data objects comprises:

identifying a server associated with the at least the portion of the first set of data objects; and transmitting a request to the server for the at least the portion of the first set of data objects.

20. The method of claim 15, wherein the plurality of data objects include at least a first data object, the first data object including an object property, and the presentation of the first data object comprises a graphical attribute based on the object property.

* * * * *